United States Patent
Hibbett et al.

(10) Patent No.: US 10,862,846 B2
(45) Date of Patent: Dec. 8, 2020

(54) MESSAGE NOTIFICATION ALERT METHOD AND APPARATUS

(71) Applicant: Intel Corporation, Santa Clara, CA (US)

(72) Inventors: Mike Hibbett, Dublin (IE); Jelle Sels, Sint-Joris-Weert (BE); Joseph Jardine, Maynooth (IE); William Rafferty, Dublin (IE); Diarmaid O'Cualain, Galway (IE)

(73) Assignee: Intel Corporation, Santa Clara, CA (US)

( * ) Notice: Subject to any disclaimer, the term of this patent is extended or adjusted under 35 U.S.C. 154(b) by 25 days.

(21) Appl. No.: 15/989,898

(22) Filed: May 25, 2018

(65) Prior Publication Data

US 2019/0044905 A1 Feb. 7, 2019

(51) Int. Cl.
*H04L 12/58* (2006.01)
*H04L 29/08* (2006.01)
*H04W 4/02* (2018.01)
*H04L 12/24* (2006.01)

(52) U.S. Cl.
CPC .......... *H04L 51/24* (2013.01); *H04L 41/0604* (2013.01); *H04L 67/18* (2013.01); *H04W 4/023* (2013.01)

(58) Field of Classification Search
CPC ..... H04L 67/18; H04L 51/24; H04L 41/0604; H04W 4/023
See application file for complete search history.

(56) References Cited

U.S. PATENT DOCUMENTS

| | | |
|---|---|---|
| 8,560,307 B2 | 10/2013 | El-Maleh et al. |
| 8,713,120 B2 | 4/2014 | Heikes et al. |
| 8,949,363 B2 | 2/2015 | Gray |
| 9,414,420 B2 | 8/2016 | Kuwahara |
| 9,800,532 B2 | 10/2017 | Chakra et al. |
| 9,807,217 B1 | 10/2017 | LeBeau et al. |

(Continued)

FOREIGN PATENT DOCUMENTS

| | | |
|---|---|---|
| KR | 10-0464348 B1 | 1/2005 |
| WO | WO 01/69387 A2 | 9/2001 |

OTHER PUBLICATIONS

TOA Canada Corporation, "Audio, intercom, Mass notification & voice evacuation Product catalogue", Feb. 26, 2015, 124 pages.

(Continued)

*Primary Examiner* — Azizul Choudhury
(74) *Attorney, Agent, or Firm* — Schwabe, Williamson & Wyatt, P.C.

(57) ABSTRACT

In embodiments, an apparatus for computing may include a receiver; a speaker; circuitry coupled to the receiver and speaker; and a service to be operated by the circuitry to receive an instance of a message via the receiver, and to conditionally affect a provision, through the speaker, an audio notification alert of the receipt of the instance of the message. In embodiments, to conditionally affect the provision may include to bypass or cause to bypass of the provision of the audio notification alert, on determination that another audio notification alert has been or will be provided by another proximally located apparatus for receiving another instance of the same message. Other embodiments may be described and claimed.

8 Claims, 8 Drawing Sheets

(56) References Cited

U.S. PATENT DOCUMENTS

| | | | |
|---|---|---|---|
| 2013/0143529 A1 | 6/2013 | Leppanen | |
| 2013/0325951 A1* | 12/2013 | Chakra | H04L 51/24 709/204 |
| 2013/0339436 A1* | 12/2013 | Gray | H04L 51/24 709/204 |
| 2014/0241517 A1 | 8/2014 | Varoglu et al. | |
| 2014/0364089 A1 | 12/2014 | Lienhart et al. | |
| 2015/0195692 A1 | 7/2015 | Chow et al. | |
| 2018/0048609 A1 | 2/2018 | Chakra et al. | |

OTHER PUBLICATIONS

Cisco, "Multiple Device Messaging", Dec. 15, 2017, 4 pages, Configuration and Administration of IM and Presence Service on Cisco Unified Communications Manager, Release 115(1).
International Search Report and Written Opinion dated Sep. 6, 2019 for International Application No. PCT/US2019/028782, 11 pages.

* cited by examiner

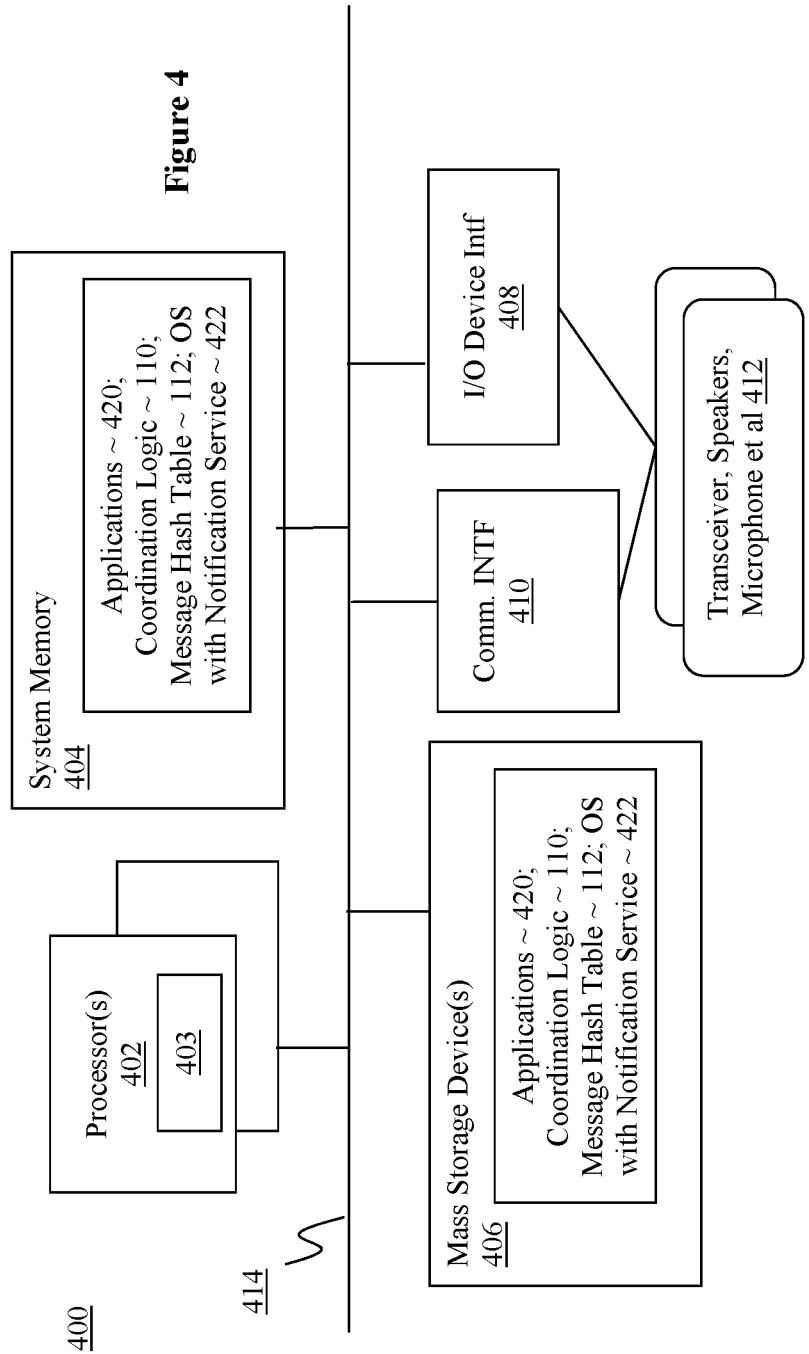

MESSAGE NOTIFICATION ALERT METHOD AND APPARATUS

TECHNICAL FIELD

The present disclosure relates to the fields of mobile computing and communication, in particular, to message notification alert method and apparatus.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

With advances in integrated circuit, computing and communication technologies, there are increasing numbers of laptops, smartphones, tablets and other mobile computing and/or communication devices being used. It is not uncommon to have several computing and/or communication devices proximally located within each other, and active at any one time. In such cases, it is annoying that all of these devices generate audio notification alerts for the same incoming message, be that email, Facebook notifications, Twitter messages, and so forth. Due to network path delays and device 'polling' settings, the different instances of the same message may arrive at the different devices at slightly different times, resulting in a symphony of successive audio notification alerts of the various arrivals. This is particularly annoying at meal times or other social events.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 4 illustrates an example computer system, suitable for use to practice the present disclosure (or aspects thereof), in accordance with various embodiments.

DETAILED DESCRIPTION

Figure 1:
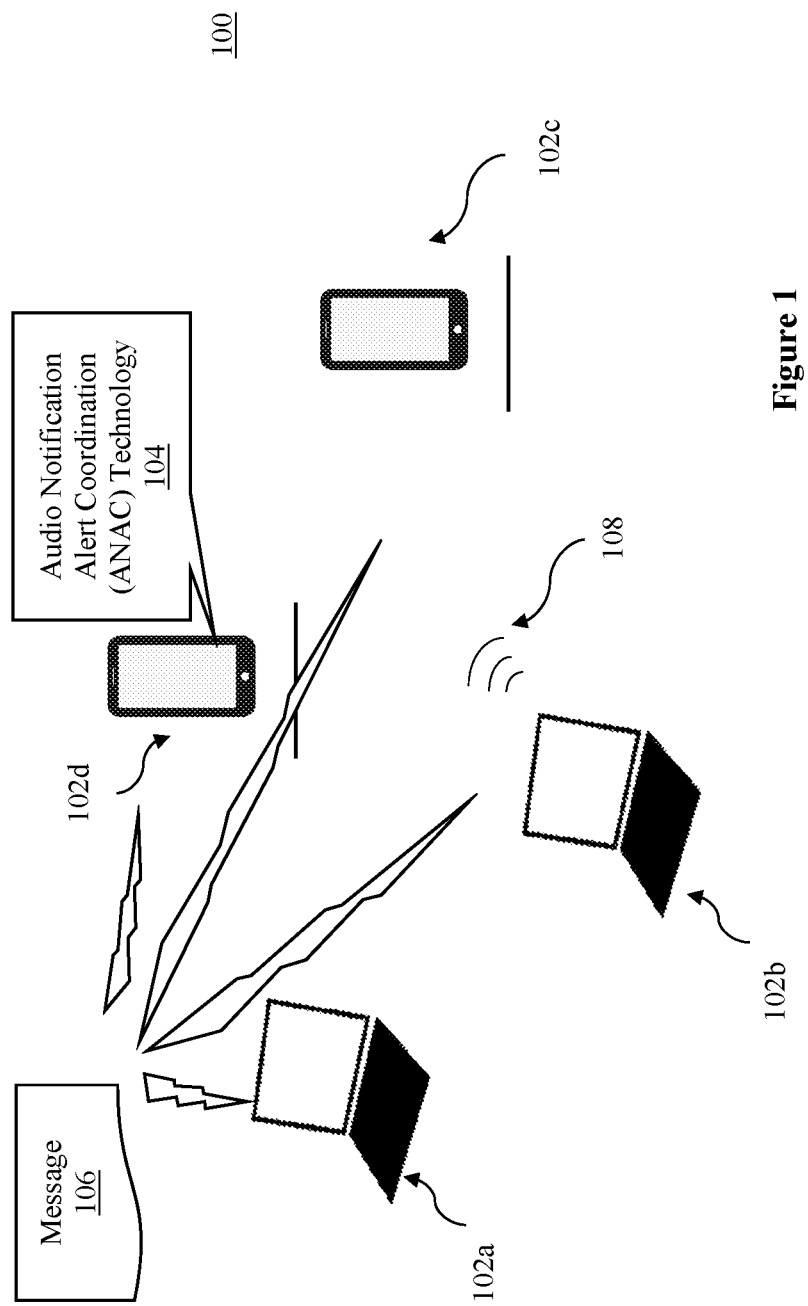
FIG. 1 illustrates an overview of an example computing and/or communication environment having the audio notification alert coordination technology of the present disclosure, in accordance with various embodiments.

The present disclosure presents methods and apparatuses for message notification alert. In particular, the present disclosure presents methods and apparatuses for coordinating audio notification alert for receipt of the same message by multiple proximally located devices. In embodiments, an apparatus for computing may include a receiver; a speaker; circuitry coupled to the receiver and speaker; and a service to be operated by the circuitry to receive an instance of a message via the receiver, and to conditionally affect a provision, through the speaker, an audio notification alert of the receipt of the instance of the message. In embodiments, to conditionally affect the provision may include to bypass or cause to bypass of the provision of the audio notification alert, on determination that another audio notification alert has been or will be provided by another proximally located apparatus for receiving another instance of the same message.

In the description to follow, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the terms "interface" and "engine" may refer to, be part of, or include an Application Specific Integrated Circuit (ASIC), an electronic circuit, a programmable combinational logic circuit (e.g., field programmable gate arrays (FPGA)), a processor (shared or dedicate) and/or memory (shared or dedicated) that execute a plurality of programming instructions of one or more software or firmware programs to provide the described functionality.

Referring now FIG. 1, wherein an overview of an example computing and/or communication environment having the audio notification alert coordination technology of the present disclosure, in accordance with various embodiments, is shown. As illustrated, example computing and/or communication environment 100 may include a number of computing devices 102a-102d proximally located to each other at particular point in time. For example, a number of laptops, smartphones, tablets and so forth may be proximally located to each other in a session of a conference, or at a family dinner. In the example conference session situation, all the devices may receive the same conference related announcement message or email, e.g., message 106, at roughly (but not exactly) the same time, resulting in a symphony of successive audio notification alerts, e.g., 108, of receipt of the same conference related announcement message or email, unless all the devices are silenced. Similarly, in the sample family dinner situation, all the devices may receive a social message, e.g., message 106, from a common friend of a social network at roughly (but not exactly) the same time, resulting also in a symphony of audio notification alerts, e.g., 108, of receipt of the same social message, unless all the devices are silenced.

To prevent or reduce the likelihood of such annoying/undesirable experience, devices 102a-102d may be respectively incorporated with the audio notification alert coordination (ANAC) technology of the present disclosure. For ease of illustration, incorporation of the ANAC technology is illustrated for device 102d only. As a result of the respective incorporation of the ANAC technology in devices 102a-102d, typically, only one device, the earliest receiving device of an instance of message 106, would provide audio notification alert 108 for the receipt of message 106. Other devices 102a, 102c and 102d, receiving their respective instances of message 106 would suppress or bypassing generation of the audio notification alert 108, thereby potentially providing an enhanced user experience for users of devices 102a-102d.

It should be noted while for ease of understanding, only four (4) devices are illustrated in FIG. 1, in real life, there could be many more devices of many more users proximally located from each other at one point in time, with each potentially giving audio notification alerts for receipt of incoming messages. On the other hand, in embodiments, the practice may be limited to devices of a single user, that is, a user with multiple devices (e.g., a tablet and a smartphone) will receive only one audio alert.

Figure 2A:
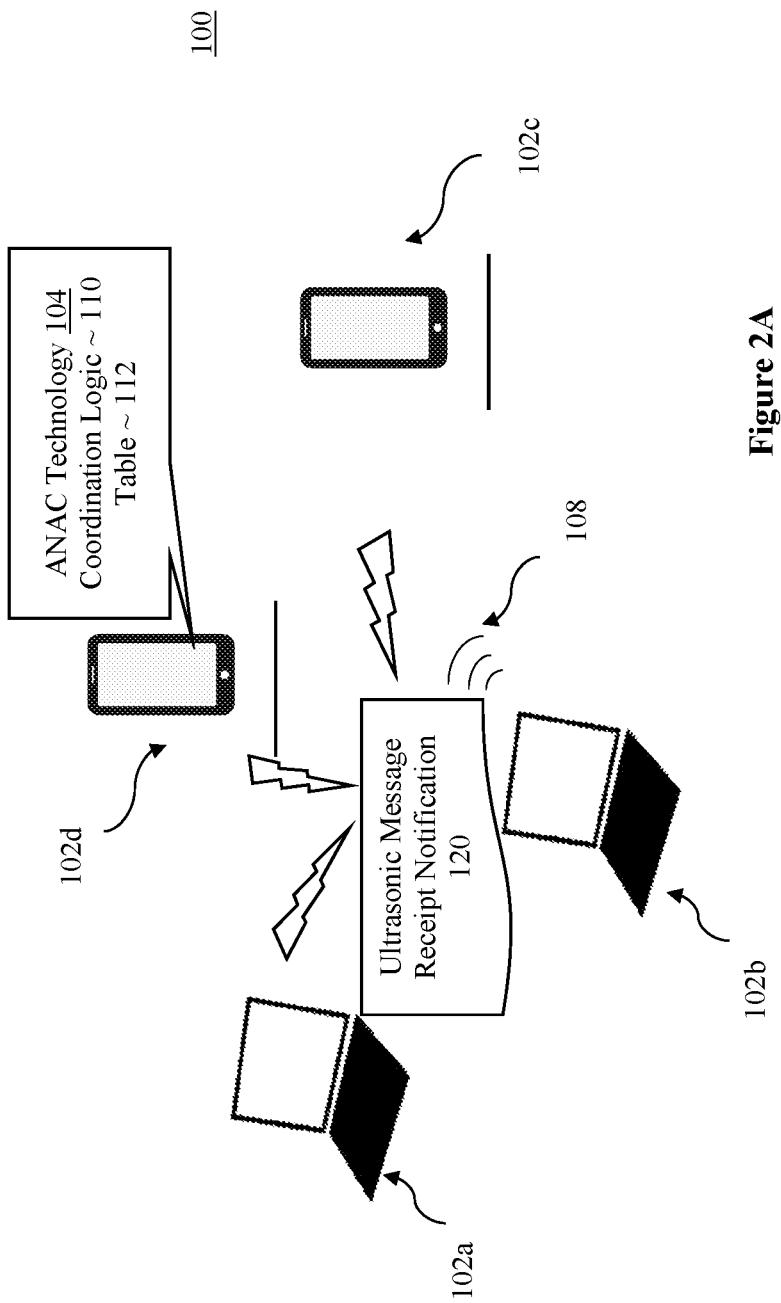
FIGS. 2A-2B illustrate the computing and/or communication environment of FIG. 1 in further detail, in accordance with various embodiments.
Figure 2B:
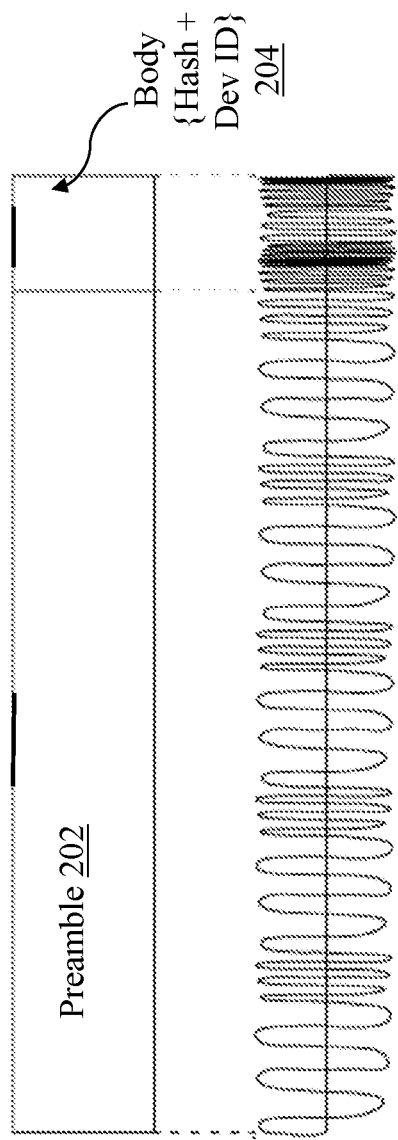

Referring now to FIGS. 2A-2B, wherein the computing and/or communication environment of FIG. 1 is illustrated in further detail, in accordance with various embodiments. As shown, in embodiments, ANAC technology 104 incorporated in a device 102a-102d may include coordination logic 110. In embodiments, coordination logic 110 may be configured to monitor for receipt of messages. In embodiments, coordination logic 110 may register itself with a service of an operating system of a device to notify coordination logic 110 about arrivals of messages. Further, coordination logic 110 may be configured to determine, on detection or notification of the receipt of a message, whether the received message is already known to at least one of the other proximally located devices 102a-102d. In embodiments, coordination logic 110 is provided with an associated table 112 to store identifiers of received messages, to allow coordination logic 110 to determine whether the received message is already known to at least one of the other proximally located devices 102a-102d. In embodiments, the message identifiers may be hash values generated based on content of the messages (to be described more fully below). In some embodiments, the message identifiers may be hash values generated further based on other secondary factors, such as group identifiers or individual email addresses, in addition to the content of the messages, to provide more granular scope of coordination. For example, if the message identifiers are hash values generated further based on individual email addresses, alert coordination would apply only to messages received by devices of the same user, e.g., a user having a mobile phone, a laptop, and so forth, proximally disposed to each other. In some embodiments, the message identifiers may be hash values generated based at least on the sender and recipient email addresses. In any case, table 112 may also be referred to as message hash table 112.

On determination that the received message is not already known to at least one of the other proximally located devices 102a-102d, coordination logic 110 may broadcast a message receipt notification 120 for the other devices 102a-102d, informing the other devices 102a-102d of the first receipt of the message. On broadcast of the message receipt notification 120, coordination logic 110 may take no further action in suppression of the generation of audio notification alert 108, allowing the users of devices 102a-102d to be audibly notified of the receipt of the message. Alternatively, in embodiments, coordination logic 110 may be configured to affirmatively cause the generation of audio notification alert 108 (e.g., request the notification service of the operating system of the device to generate audio notification alert 108.

On the other hand, on determination that the received message is already known to at least one of the other proximally located devices 102a-102d, coordination logic 110 may skip broadcasting of a message receipt notification 120 for the other devices 102a-102d. Further, coordination logic 110 may take affirmative action in suppression of the generation of audio notification alert 108 for the received message, to avoid duplication of audio notification alert having been or to be provided by the other devices 102a-102d. In embodiments, coordination logic 110 may be configured to affirmatively suppress the output of audio notification alert 108, e.g., by shutting off audio outputs (such as, speakers) of the device), or request the notification service of the operating system of the device to skip generation and/or causing output of audio notification alert 108

In embodiments, coordination logic 110 may be implemented as a standalone middleware service of the device. In other embodiments, coordination logic 110 may be integrated with respective ones of the applications receiving the messages. In still other embodiments, coordination logic 110 may be integrated with the operating system of the device, e.g., a message notification service of the operating system.

In embodiments, message receipt notification 120 may be broadcast as an "ultrasonic" message, in a frequency that is outside the range of human hearing frequencies, such that it will not be heard by the users of devices 102a-102d. FIG. 2B illustrates an example "ultrasonic" message receipt notification 200 (in a frequency outside the range of human hearing frequencies). Example "ultrasonic" message receipt notification 200 may include a preamble portion 202 and a body portion 204. Preamble portion 202 may include a signal signature to enable a receiving device to recognize the signal as an "ultrasonic" message receipt notification 200. Body portion 204 may include a hash of the message to identify the message, and a device identifier to identify the broadcasting device.

Figure 3A:
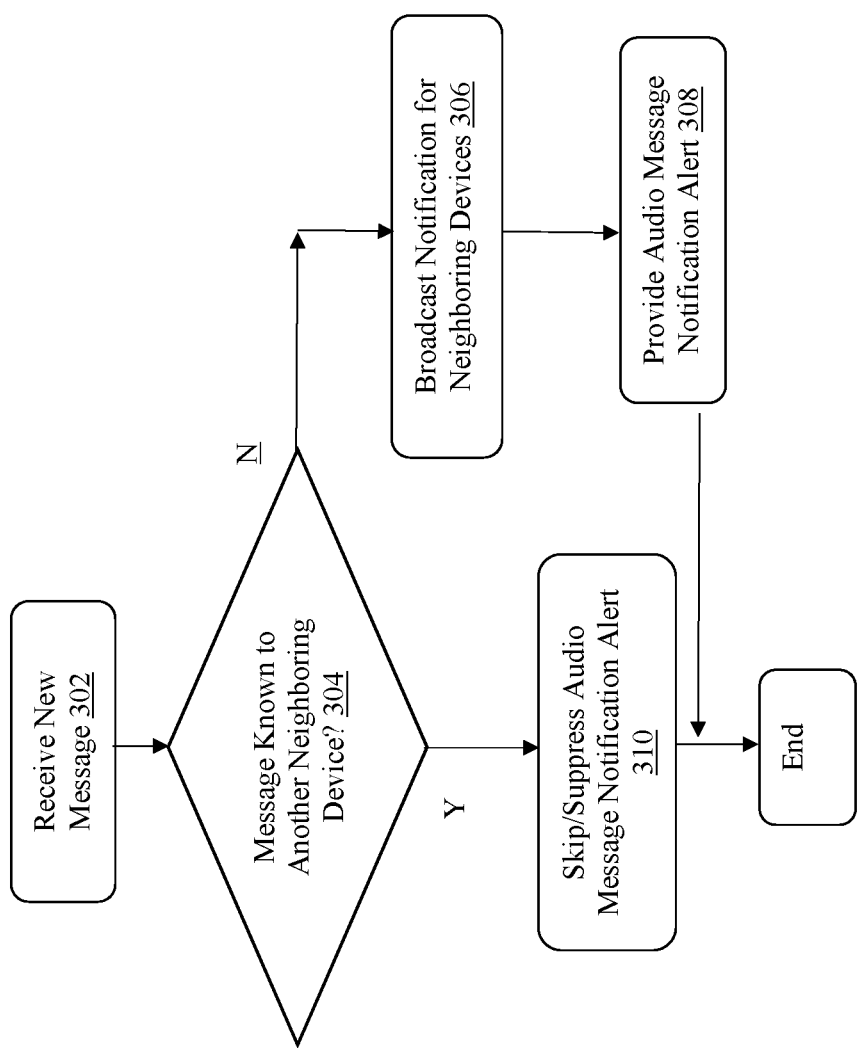
FIGS. 3A-3C illustrate an example process for coordinating message notification alerts, in accordance with various embodiments.
Figure 3B:
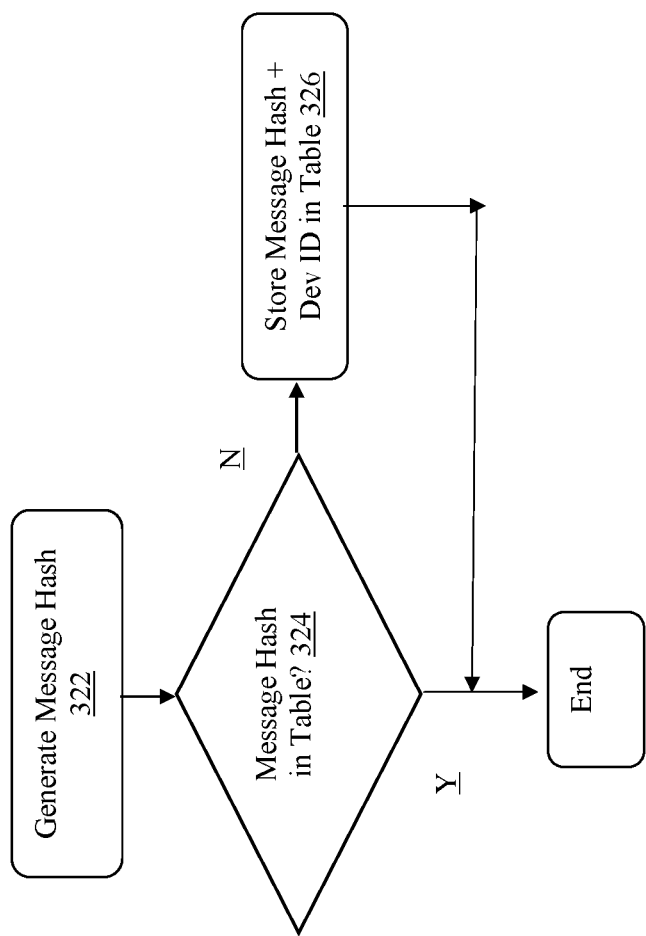
Figure 3C:
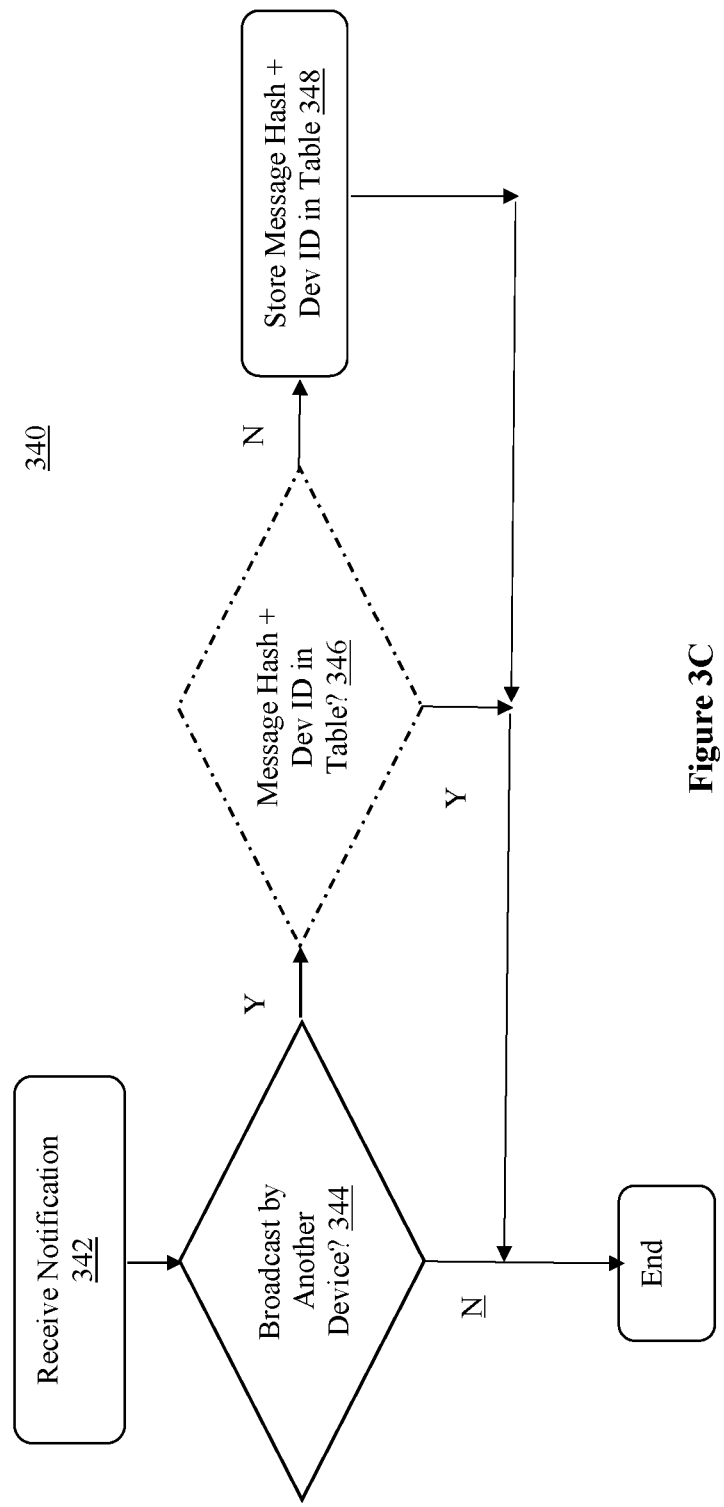

Referring now to FIGS. 3A-3C, wherein example processes for coordinating message notification alerts, in accordance with various embodiments, is shown. As illustrated, processes for coordinating message notification alerts may include processes 300, 320 and 340. Processes 300, 320 and 340 may be performed e.g., by the earlier described coordination logic 110 of ANAC technology incorporated in a device 102a-102d. In alternate embodiments, processes 300, 320 and 340 may include more or less operations, the operations may be combined or split, or having the operations performed in different order.

Process 300 may be associated with monitoring for receipt of a new message. Process 300 may start at block 302 where the receipt or an arrival of a message is detected. The message may be received e.g., through a receiver of the device. Next at block 304, a determination may be made on whether the received message is already known to at least one of the proximally located/neighboring devices (to be described more fully later on with references to FIG. 3b).

If the received message is already known to at least one of the proximally located/neighboring devices (Yes ("Y") branch), process 300 may proceed to block 310. At block 310, the provision of audio message notification alert may be skipped or suppressed. As described earlier, depending on implementation, having the received message subsequently displayed on the receiving device (on request of the user of the device), without providing any audio alert of the arrival of the message, may involve affirmative action on the part of coordination logic 110, such as shutting off the audio outputs (e.g., speakers) of the device temporarily, or requesting a notification service of an operating system to skip triggering the audio alert.

On the other hand, if the received message is not already known to at least one of the proximally located/neighboring devices (No ("N") branch), process 300 may proceed to block 306. At block 306, an "ultrasonic" message receipt notification may be broadcast for the neighboring devices at a frequency outside the human hearing frequencies. In embodiments, a user device may include a power-saving mode, when selected by the user, the device would power on the receiver (e.g., microphone) for a limited duration to listen for the "ultrasonic" message. Next, at block 308, the audio message notification alert may be provided. Thereafter, the received message may be displayed on the receiving device, on request of the user of the device. As described earlier, depending on implementation, provision of the audio message notification alert, may involve affirmative action on the part of coordination logic 110, such as requesting a notification service of an operating system to trigger the audio alert, or take no action to influence the triggering of the audio alert by a notification service of the operating system.

FIG. 3B illustrates an embodiment for a process for implement the determination performed at block 304 of FIG. 3A. Process 320 for implementing the determination performed at block 304 of FIG. 3A to ascertain whether the received message is already known to at least one of the neighboring devices may include operations performed at blocks 322-326.

Process 320 may start at block 322. At block 322, a hash may be generated for a receipt message, based at least in part on the content of the message, to serve as an identifier of the message. Next, at block 324, a determination may be made using the generated hash to ascertain whether a hash of the message has already been stored in a message hash table. The presence of the message hash in the message hash table may signify the message is already known to at least one of the other neighboring devices (earlier received by the at least one of the other neighboring devices). If a result of the determination indicates that the message hash is already in the message hash table (Yes "Y" branch), process 320 may end, and an inference may be made that the message is already known to at least one of the other neighboring devices. On the other hand, if a result of the determination indicates that the message hash is not already in the message hash table (No "N" branch), process 320 may proceed to block 326. At block 326, the message hash along with an identifier identifying the device may be stored in the message hash table, and an inference may be made that the message is not already known to at least one of the other neighboring devices. The device is the first among the devices in receiving the message.

FIG. 3C illustrates an embodiment for a process for listening or monitoring for the "ultrasonic" message receipt notifications broadcast by the neighboring devices. Process 340 for monitoring or listening for the "ultrasonic" message receipt notifications broadcast by the neighboring devices may include operations performed at blocks 342-328.

Process 340 may start at block 342. At block 342, an "ultrasonic" message receipt notification may be detected/received, e.g., via a microphone of the device. Next at block 344, a determination may be made on whether the "ultrasonic" message receipt notification is broadcast by another device. If a result of the determination indicates that the "ultrasonic" message receipt notification is not broadcast by another device (No "N" branch), process 340 may end. The "ultrasonic" message receipt notification was broadcast by the device itself. In embodiments, the determination may be made based at least in part on the device identifier included in the "ultrasonic" message receipt notification.

On the other hand, if a result of the determination indicates that the "ultrasonic" message receipt notification was broadcast by a neighboring device (Yes "Y" branch), process 340 may proceed to block 348, or optionally at block 346 first. For embodiments where e.g., due to the duration of the broadcast, an "ultrasonic" message receipt notification may be received more than once by a device, process 340 may proceed to block 346 first. At block 346, a determination may be made on whether the message hash and the device identifier pair has already been saved in the message hash table. If a result of the determination indicates the message hash and the device identifier pair has already been saved in the message hash table (Yes "Y" branch), process 340 may end. If a result of the determination indicates the message hash and the device identifier pair has not already been saved in the message hash table (No "N" branch), process 340 may proceed to block 348.

At block 348, the message hash and the device identifier pair may be saved in the message hash table, allowing the device to determine that the message is already known to a neighboring device, if the device later receives the same message.

Referring now to FIG. 4, wherein a block diagram of a computer device suitable for use to practice the present disclosure (or aspects thereof), in accordance with various embodiments, is illustrated. As shown, in embodiments, computer device 400 may include one or more processors 402 and system memory 404. Each processor 402 may include one or more processor cores. In embodiments, one or more processors 402 may include one or more hardware accelerators 403 (such as, FPGA). System memory 404 may include any known volatile or non-volatile memory. Additionally, computer device 400 may include mass storage device(s) 406 (such as solid state drives), input/output device interface 408 (to interface with e.g., speakers, microphone, and so forth 412) and communication interfaces 410 (such as serial interface, near field communication, network interface cards, modems and so forth having their respective transmitters, receivers or transceivers). The elements may be coupled to each other via system bus 414, which may represent one or more buses. In the case of multiple buses, they may be bridged by one or more bus bridges (not shown).

Each of these elements may perform its conventional functions known in the art. In particular, system memory 404 and mass storage device(s) 406 may be employed to store a working copy and a permanent copy of the executable code of the programming instructions implementing the operations described earlier, e.g., but are not limited to, operations associated with coordination logic 110 (with message hash table 112). In embodiments, the executable code of the programming instructions may also implement an operating system (OS) with notification service 422 and/or one or more applications 420. In embodiments, as described earlier, coordination logic 110 may be implemented as a standalone middleware, integrated with applications 420 or integrated with OS 422. The programming instructions may comprise assembler instructions supported by processor(s) 402 or high-level languages, such as, for example, C, that can be compiled into such instructions. In embodiments, some of the functions performed by applications 420, coordination logic 110 and/or OS 422 may be implemented with hardware accelerator 403 instead.

The permanent copy of the executable code of the programming instructions and/or the bit streams to configure hardware accelerator 403 may be placed into permanent mass storage device(s) 406 or hardware accelerator 403 in the factory, or in the field, through, for example, a distribution medium (not shown), such as a compact disc (CD), or through communication interface 410 (from a distribution server (not shown)).

Except for the use of computer device 400 to host coordination logic 110 and message hash table 112, the constitutions of the elements 410-412 are otherwise known, and accordingly will not be further described.

Figure 5:
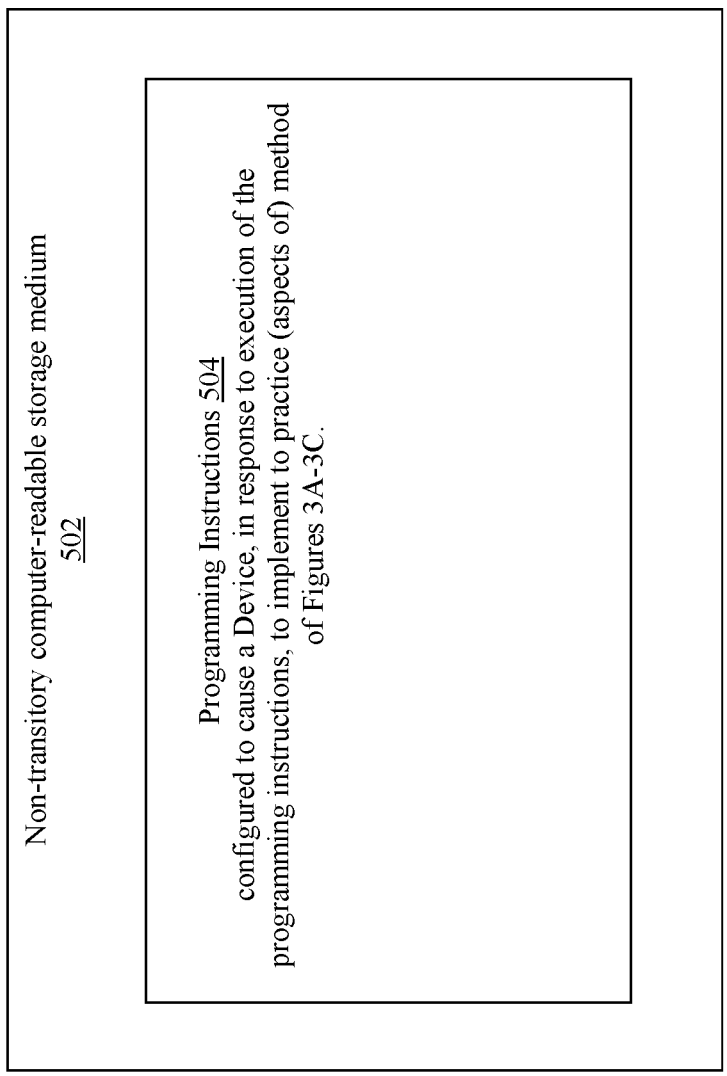
FIG. 5 illustrates an example computer readable medium suitable for use to facilitate practice of the present disclosure (or aspects thereof), in accordance with various embodiments.

Referring now to FIG. 5, wherein an example non-transitory computer-readable storage medium having instructions configured to practice all or selected ones of the operations associated with applications 420, coordination logic 110 and/or OS 422, in accordance with various embodiments, is shown. As illustrated, non-transitory computer-readable storage medium 602 may include the executable code of a number of programming instructions 604. Executable code of programming instructions 604 may be configured to enable a system, e.g., device 102*a*-102*d* or computer device 400, in response to execution of the executable code/programming instructions, to perform, e.g., various operations associated with coordination logic 110. In alternate embodiments, executable code/programming instructions 604 may be disposed on multiple non-transitory computer-readable storage medium 602 instead. In still other embodiments, executable code/programming instructions 604 may be encoded in transitory computer readable medium, such as signals.

In embodiments, a processor may be packaged together with a computer-readable storage medium having some or all of executable code of programming instructions 604 configured to practice all or selected ones of the operations earlier described. For one embodiment, a processor may be packaged together with such executable code 604 to form a System in Package (SiP). For one embodiment, a processor may be integrated on the same die with a computer-readable storage medium having such executable code 604. For one embodiment, a processor may be packaged together with a computer-readable storage medium having such executable code 604 to form a System on Chip (SoC). For at least one embodiment, the SoC may be utilized in, e.g., client device 102*a*-102*d*.

Thus, methods and apparatuses for message notification have been described. Example embodiments described include, but are not limited to:

Example 1 may be an apparatus for computing, comprising: a receiver; a speaker; circuitry coupled to the receiver and speaker; and a service to be operated by the circuitry to receive an instance of a message via the receiver, and to conditionally affect a provision, through the speaker, an audio notification alert of the receipt of the instance of the message; wherein to conditionally affect the provision includes to bypass or cause bypass of the provision of the audio notification alert, on determination that another audio notification alert has been or will be provided by another proximally located apparatus for receiving another instance of the same message.

Example 2 may be example 1, wherein on receipt of the instance of the message, the service determines whether there is such another proximally located apparatus having received the another instance of the same message, and provided or about to provide the another audio notification alert.

Example 3 may be example 2, wherein to determine whether there is such another proximally located apparatus, the service generates a hash for the message based at least in part on content of the message, and check for whether the hash has already been previously stored in a message hash table on the apparatus.

Example 4 may be example 3, wherein on generation of the hash and determination that the hash has not been previously stored in the message hash table, the service stores the hash together with a device identifier of the apparatus in the message hash table.

Example 5 may be example 2, wherein on determination that there isn't such another proximally located apparatus, the service causes a notification with the hash of the message and a device identifier of the apparatus to be broadcast for proximally located apparatuses.

Example 6 may be example 5, wherein to cause a notification with the hash of the message and a device identifier of the apparatus to be broadcast for proximally located apparatuses, the service causes an ultrasonic message receipt notification with the hash of the message and the device identifier of the apparatus to be broadcast for the proximally located apparatuses at a frequency outside human hearing frequencies.

Example 7 may be example 5, further comprising a microphone, wherein the service further listens with the microphone for broadcasts of notifications with hashes of messages and device identifiers.

Example 8 may be example 7, wherein on receipt of a notification with a hash of a message and a device identifier, the service further determines whether the notification is broadcast by the apparatus or another proximally located apparatus.

Example 9 may be example 8, wherein on determination that the notification is broadcast by another proximally located apparatus, the service stores the notification into a message hash table.

Example 10 may be any one of examples 1-9 further comprising an application having the service or an operating system having the service.

Example 11 may be 1 method for computing, comprising: receiving, by a computing device, an instance of a message; determining, by the computing device, whether there is another proximally located computing device having received another instance of the same message; and causing a notification to be broadcast for proximally located computing devices on determining that there isn't such another proximally located computing device having received another instance of the same message.

Example 12 may be example 11, further comprising conditionally affecting, by the computing device, a provision of an audio notification alert of the receipt of the instance of the message by the computing device, on determining that there is another proximally located computing device having received another instance of the same message.

Example 13 may be example 11, wherein determining whether there is another proximally located computing device having received another instance of the same message comprises generating a hash for the message based at least in part on content of the message, and checking for whether the hash has already been previously stored in a message hash table of the computing device.

Example 14 may be example 13 further comprising storing the hash together with a device identifier of the computing device in the message hash table, on generation of the hash and determining that the hash has not been previously stored in the message hash table.

Example 15 may be example 13, wherein causing a notification to be broadcast for proximally located computing devices comprises causing an ultrasonic message receipt notification with the hash of the message and the device identifier of the computing device to be broadcast for the proximally located computing device at a frequency outside human hearing frequencies.

Example 16 may be any one of examples 11-15, further comprising monitoring for broadcasts of notifications by proximally located computing devices in association with receipt of instances of messages.

Example 17 may be example 16, further comprising on detection of a notification from a proximally located computing device, extracting a hash of a message and a device identifier from the notification; and storing the message and the device identifier of the notification into a message hash table.

Example 18 may be at least one computer readable media (CRM) comprising a plurality of instructions arranged to cause a device, in response to execution of the instructions by a processor of the device, to operate a service to: monitor for notifications broadcast by other proximally located devices in association with receipt of instances of messages by the other proximally located devices; and on receipt of a notification from one of the other proximally located devices, with the notification having a hash of a message and a device identifier, stores the notification with the hash of a message and the device identifier into a message hash table.

Example 19 may be example 18, wherein the service is to further: receive an instance of a message; and conditionally affect a provision of an audio notification alert of the receipt of the instance of the message; wherein to conditionally affect the provision includes to determine that another audio notification alert has been or will be provided by another proximally located device for receiving another instance of the same message, and bypassing or causing to be bypassed the provision of the audio notification alert.

Example 20 may be example 19, wherein on receipt of the instance of the message, the service determines whether there is another proximally located device having received the another instance of the same message, and provided or about to provide the another audio notification alert.

Example 21 may be example 20, wherein to determine whether there is another proximally located device having received the another instance of the same message, the service generates a hash for the message based at least in part on content of the message, and check for whether the hash has already been previously stored in a message hash table on the device.

Example 22 may be example 21, wherein on generation of the hash and determination that the hash has not been previously stored in the message hash table, the service stores the hash together with a device identifier of the device in the message hash table.

Example 23 may be example 20, wherein on determination that there isn't another proximally located device having received the another instance of the same message, the service causes a notification with the hash of the message and a device identifier of the device to be broadcast for proximally located devices.

Example 24 may be example 23, wherein to cause a notification with the hash of the message and a device identifier of the device to be broadcast for proximally located devices, the service causes an audio message receipt notification with the hash of the message and the device identifier of the device to be broadcast for the proximally located devices at a frequency outside human hearing frequencies.

Example 25 may be example 22, wherein the service further listens for broadcasts of notifications with hashes of messages and device identifiers; on receipt of a notification with a hash of a message and a device identifier, the service further determines whether the notification is broadcast by the device or another proximally located device; and on determination that the notification is broadcast by another proximally located device, the service stores the notification into a message hash table.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for computing, comprising:
   a receiver;
   a speaker;
   circuitry coupled to the receiver and speaker; and
   a service to be operated by the circuitry to receive an instance of a message via the receiver, and to conditionally affect a provision, through the speaker, of an audio notification alert of the receipt of the instance of the message;
   wherein to conditionally affect the provision includes to bypass or cause bypass of the provision of the audio notification alert, on determination that another audio notification alert has been or will be provided by another proximally located apparatus for earlier receiving another instance of the same message;
   wherein the service is operated to, on receipt of the instance of the message, determine whether there is such another proximally located apparatus having earlier received the another instance of the same message, and provided or about to provide the another audio notification alert;
   wherein to determine whether there is such another proximally located apparatus, the service is further operated to check a local message table for information indicating of the apparatus having been ultrasonically informed by such another proximally located apparatus having received the another instance of the message.

2. The apparatus of claim 1, wherein to determine whether there is such another proximally located apparatus, the service is further operated to generate a hash for the message based at least in part on content of the message, and check for whether the hash has already been previously received from such another proximally located apparatus and stored in the local message table on the apparatus.

3. The apparatus of claim 2, wherein the service is further operated to, on generation of the hash and determination that the hash has not been previously received from such another proximally located apparatus and stored in the local message hash table, store the hash together with a device identifier of the apparatus in the local message table.

4. The apparatus of claim 2, wherein the service is further operated to, on determination that there isn't such another proximally located apparatus, cause a notification with the hash of the message and a device identifier of the apparatus to be ultrasonically broadcast for proximally located apparatuses.

5. The apparatus of claim 4, wherein to cause a notification with the hash of the message and a device identifier of the apparatus to be ultrasonically broadcast for proximally located apparatuses, the service is further operated to cause a message receipt notification with the hash of the message and the device identifier of the apparatus to be ultrasonically broadcast for the proximally located apparatuses at a sonic frequency outside human hearing frequencies.

6. The apparatus of claim 4, further comprising a microphone, wherein the service is further operated to listen with the microphone for ultrasonic broadcasts of notifications with hashes of messages and device identifiers.

7. The apparatus of claim 6, wherein the service is further operated to, on receipt of an ultrasonically broadcast notification with a hash of a message and a device identifier, determine whether the notification is ultrasonically broadcast by the apparatus or another proximally located apparatus.

8. The apparatus of claim 7, wherein the service is further operated to, on determination that the notification is ultrasonically broadcast by another proximally located apparatus, store the notification into the local message table.

* * * * *